(12) United States Patent
Kleiner et al.

(10) Patent No.: US 10,827,136 B2
(45) Date of Patent: Nov. 3, 2020

(54) THERMAL IMAGING CAMERA AND THERMAL IMAGING CAMERA SYSTEMS

(71) Applicant: Dräger Safety AG & Co.KGaA, Lübeck (DE)

(72) Inventors: Sebastian Kleiner, Testorf Steinfort (DE); Mikko Werner, Bad Schwartau (DE); Alexander Korff, Lübeck (DE)

(73) Assignee: Dräger Safety AG & Co.KGaA, Lübeck (DE)

( * ) Notice: Subject to any disclaimer, the term of this patent is extended or adjusted under 35 U.S.C. 154(b) by 0 days.

(21) Appl. No.: 16/210,382

(22) Filed: Dec. 5, 2018

(65) Prior Publication Data

US 2019/0182438 A1    Jun. 13, 2019

(30) Foreign Application Priority Data

Dec. 13, 2017  (DE) .......................... 10 2017 011 533

(51) Int. Cl.
*H04N 5/33* (2006.01)
*A42B 3/04* (2006.01)
(Continued)

(52) U.S. Cl.
CPC .............. *H04N 5/33* (2013.01); *A42B 3/042* (2013.01); *A42B 3/0433* (2013.01); *A62B 18/08* (2013.01); *G03B 17/561* (2013.01); *G03B 17/563* (2013.01); *H04N 5/2257* (2013.01); *H04N 5/38* (2013.01)

(58) Field of Classification Search
CPC .......... G02B 27/017; G02B 2027/0178; G06F 1/163; G06F 3/017; G06F 3/013; H04N 5/23293; H04N 5/33; H04N 5/332; G06T 19/006; G06K 9/00671
See application file for complete search history.

(56) References Cited

U.S. PATENT DOCUMENTS 5,200,827 A    4/1993  Hanson et al.
7,795,574 B2   9/2010  Kennedy et al.
(Continued)

FOREIGN PATENT DOCUMENTS

AT        517332 B1     1/2017
DE    694 03 270 T2    8/1997
(Continued)

*Primary Examiner* — Farhan Mahmud
(74) *Attorney, Agent, or Firm* — McGlew & Tuttle, P.C.

(57) ABSTRACT

A thermal imaging camera includes a fastening device, which is configured to be mechanically coupled with a fastening element of protective clothing of a user, to detachably fasten the thermal imaging camera to the protective clothing. The thermal imaging camera further includes a first interface as well as a second interface, which are each configured to output data of a thermal image. The thermal imaging camera further includes a control circuit, which is configured to detect a mechanical coupling of the second interface with a third interface of a display device and to output the data of the thermal image exclusively via the second interface as a result of the detection of the mechanical coupling. The control circuit is further configured to output the data of the thermal image via the first interface when the second interface is not coupled mechanically with the third interface.

20 Claims, 5 Drawing Sheets

(51) Int. Cl.
*A62B 18/08* (2006.01)
*G03B 17/56* (2006.01)
*H04N 5/225* (2006.01)
*H04N 5/38* (2006.01)

(56) References Cited

U.S. PATENT DOCUMENTS

| | | |
|---|---|---|
| 2008/0023002 A1 | 1/2008 | Guelzow et al. |
| 2010/0001187 A1 | 1/2010 | Fenske et al. |
| 2011/0084685 A1 | 4/2011 | Zhong et al. |
| 2015/0201131 A1 | 7/2015 | Ohshima |
| 2015/0220110 A1 | 8/2015 | Brawer |
| 2016/0182785 A1 | 6/2016 | Ogata et al. |
| 2017/0150032 A1 | 5/2017 | Chenn |
| 2018/0109740 A1* | 4/2018 | Pickett .................... H04N 5/33 |

FOREIGN PATENT DOCUMENTS

| | | |
|---|---|---|
| DE | 201 05 784 U1 | 8/2001 |
| DE | 101 47 045 B4 | 3/2005 |
| DE | 10 2005 024 450 B3 | 5/2006 |
| DE | 11 2007 000 686 T5 | 1/2009 |
| DE | 10 2008 004 785 B4 | 6/2012 |
| DE | 10 2013 011 195 A1 | 1/2015 |
| GB | 2526575 A | 12/2015 |
| WO | 2001/042845 A1 | 6/2001 |

* cited by examiner

THERMAL IMAGING CAMERA AND THERMAL IMAGING CAMERA SYSTEMS

CROSS REFERENCE TO RELATED APPLICATIONS

This application claims the benefit of priority under 35 U.S.C. § 119 of German Application 10 2017 011 533.8, filed Dec. 13, 2017, the entire contents of which are incorporated herein by reference.

TECHNICAL FIELD

The invention relates to a thermal imaging camera as well as to a thermal imaging camera system.

BACKGROUND

Firefighters or others who wear respiratory protection use thermal imaging cameras in greatly varying situations. Conventional, handheld thermal imaging cameras can enable a firefighter, for example, to see through smoke and thus orient himself in situations having a lack of visibility. As a result of the thermal imaging camera, the firefighter cannot use both hands, however, for example, to also use the hands for orientation or to move forward more rapidly. So-called helmet-integrated or full-mask-integrated or mounted thermal imaging cameras (head-mounted thermal imaging camera) can enable the firefighter to use both hands in such situations. However, these thermal imaging cameras have the disadvantage, for example, that the thermal imaging camera always has to be used with the helmet or the full mask and the camera image can only be seen by the firefighter himself. This means that the camera image cannot be shared with further persons (for example, further firefighters of a fire brigade).

SUMMARY

There is a need for providing an improved concept for a thermal imaging camera.

A first exemplary embodiment relates to a thermal imaging camera. The thermal imaging camera is a camera which makes the thermal radiation of an object or body, which is invisible to the human eye, visible by detection of the infrared radiation emitted by the object or the body. The thermal radiation is displayed in the form of a thermal image (for example, color-coded and/or coded in grayscale). The thermal imaging camera can optionally furthermore also detect optical radiation in the visible range of the spectrum. In other words: The thermal imaging camera comprises an image generation circuit, which is configured to generate data of a thermal image based on infrared radiation (and optionally additionally visible radiation) in surroundings of the thermal imaging camera. The thermal image can be both a moving image and also a stationary image.

The thermal imaging camera comprises a fastening device, which is configured to be mechanically coupled to a fastening element of protective clothing of a user in order to detachably fasten the thermal imaging camera on the protective clothing of the user. Protective clothing is any clothing which protects the user from hazardous influences, such as heat, flames, moisture, cold, electro static charge, chemicals, pressure, etc. The protective clothing may enclose the entire body of the user or only a section of the body. According to some exemplary embodiments, the protective clothing can be, for example, a helmet, a respiratory protection mask (gas mask), an overcoat, a full body protective suit, a belt (for example, a firefighter belt), etc. The fastening device may be any device which enables a detachable (i.e., reversible) fastening of the thermal imaging camera on the protective clothing. For example, the fastening device can be a (stretchable or elastic) band, configured to fasten the thermal imaging camera, for example, to a helmet or another head cover. In some exemplary embodiments, the fastening device may also be a catch (locking) element, which locks in (snaps in) a corresponding counterpart (a counterpart fastening element) on the protective clothing. However, the fastening device may also have any other suitable shape and/or configuration.

The thermal imaging camera may further comprise a first interface and a second interface, which are each configured to output data of a thermal image. The first interface can be embodied both as wireless configuration and also wired configuration. The second interface is a wired interface. The first interface and the second interface enable the output of the thermal image generated by the thermal imaging camera to third-party devices, such as display devices (for example, monitors or display screens).

The thermal imaging camera may further comprise a control circuit (control unit), which is configured to detect a mechanical coupling of the second interface to a third interface of a display device and to output the data of the thermal image exclusively via the second interface as a consequence of detecting the mechanical coupling. The control circuit is furthermore configured to output the data of the thermal image via the first interface if the second interface is not mechanically coupled to the third interface. The control circuit may comprise, for example, one or more processors or one or more processor cores, an application-specific integrated circuit (ASIC), an integrated circuit (IC), a single-chip system (SoC=system-on-a-chip), a programmable logic element, or a field-programmable gate array (FPGA) having a microprocessor, on which software for generating and outputting the data of the thermal image runs. Furthermore, the control circuit may comprise one or more memories, in which, for example, the software for generating and outputting the data of the thermal image or other data can be stored. The display device comprises a device which outputs an optical image based on the data of the thermal image. The display device may comprise a device, the optical image of which is visible only by the user or is visible by a plurality of persons. Like the second interface, the third interface is also a wired interface. The second interface of the thermal imaging camera and the third interface of the display device are mechanically connected to one another in the coupled state (for example, one or more mechanical and/or electrical contacts of one interface can be accommodated by corresponding counter contacts of the other interface).

Because of the option of reversible fastening of the thermal imaging camera on the protective clothing, the thermal imaging camera can not only be worn on the protective clothing, but rather can also be carried and/or used in the hand by the user. The user can accordingly carry the thermal imaging camera depending on the situation and/or according to his/her personal preference in the hand or fastened on his/her protective clothing. Moreover, the thermal image can be made accessible to further persons via the display device due to the option of coupling to the display device. The output of the data of the thermal image via the second interface upon coupling of the thermal imaging camera to the display device can enable a reliable and power-saving transmission of the data to the display device. Since the third interface is a wired interface, errors or glitches/dropouts in the data transmission, as can occur in the case of wireless interfaces because of external interfering influences, can be avoided. Moreover, the wired transmission can be performed with a reduced amount of power in comparison to wireless data transmission. An operating time of the thermal imaging camera can thus be extended in the case of a power supply of the thermal imaging camera by means of battery or rechargeable battery. The thermal imaging camera therefore enables improved usability by the user.

As already stated above, the first interface may be configured as a wireless interface. According to some exemplary embodiments, the first interface therefore comprises a high-frequency transmitter, which is configured to output a high-frequency signal based on the data of the thermal image. For example, the high-frequency signal may be phase-modulated, frequency-modulated, and/or amplitude-modulated in dependence on the data of the thermal image. The high-frequency signal can furthermore be generated according to a communication standard (for example, according to one of the standards IEEE 802.15.1 and IEEE 802.11 of the Institute of Electrical and Electronics Engineers). The data of the thermal image can be wirelessly output to one or more display devices via the high-frequency signal, and therefore one or more persons can observe the thermal image.

As already stated above, in the case of the mechanical coupling of the second interface to the third interface of the display device, the data of the thermal image are only output via the second interface. In addition to a deactivation of the first interface (and/or the high-frequency transmitter) or a setting of the first interface (and/or the high-frequency transmitter) in a power-saving mode, upstream components can also be deactivated or set into a power-saving mode, in order to save power. According to some exemplary embodiments, the control circuit is configured, for example, in the case of a mechanical coupling of the second interface to the third interface of the display device, to effectuate an ending of one or more algorithms which are executed in conjunction with the generation of the high-frequency signal by the thermal imaging camera. The algorithms can be, for example, algorithms for data and/or video compression for wireless transmission.

Alternatively or additionally, the first interface, as already stated above, may also comprise a wired interface. In some exemplary embodiments, the first interface therefore may comprise an electrical contact, which is configured to output an electrical signal based on the data of the thermal image. The wired configuration of the first interface can enable, for example, a failsafe and power-saving data transmission to a display device located in the vicinity of the thermal imaging camera. The thermal imaging camera may thus be fastened, for example, by means of the fastening device on a respiratory protection mask and the thermal image can be transmitted via the first interface in a wired manner to a display device (for example, small monitor) integrated into the respiratory protection mask.

As already stated above, the thermal imaging camera can not only be fastened on protective clothing, but rather also carried and/or used by hand by the user. According to some exemplary embodiments, the thermal imaging camera therefore furthermore comprises a holding device, which is configured to be grasped by a human hand to hold the thermal imaging camera. The holding device can be, for example, a handle or a correspondingly shaped housing of the thermal imaging camera, which enables the user to hold the thermal imaging camera in his/her hand.

The control and/or operation of the thermal imaging camera may be performed on the thermal imaging camera itself. In other words, according to some exemplary embodiments, the thermal imaging camera may comprise one or more operating devices (for example, knob, pushbutton, rotating or slide controller), in order to detect a control command of the user. The control circuit may accordingly furthermore be configured to control the thermal imaging camera based on the control command.

Alternatively or additionally, the thermal imaging camera can also be externally controlled via the coupled display device by means of the second interface. An alternative operation of the thermal imaging camera can thus be provided. In some exemplary embodiments, the second interface is therefore configured to receive a control command from the third interface of the display device. The control circuit is accordingly in turn configured to control the thermal imaging camera based on the control command.

The coupling of thermal imaging camera and display device can be determined or detected in manifold ways. According to some exemplary embodiments, the thermal imaging camera may comprise a sensor, for example, which is configured to output a detection signal as a consequence of the mechanical coupling of the second interface to the third interface. The sensor can be, for example, a mechanical switch, an RFID (Radio-Frequency IDentification) receiver, an optical sensor, or a magnetic sensor. The detection signal may accordingly be triggered by, for example, a mechanical element of the display device for actuating the mechanical switch upon the coupling, an RFID transmitter for emitting an identifying code of the display device upon the coupling, a magnet of the display device, etc. The control circuit is accordingly furthermore configured to detect or determine the mechanical coupling of the second interface to the third interface based on the detection signal (for example, as a result of a specific signal level of the or a specific pulse sequence in the detection signal).

Exemplary embodiments furthermore relate to a camera system. The camera system comprises a thermal imaging camera described herein and also a second (another) display device, which is configured to receive the data of the thermal image from the first interface of the thermal imaging camera. In particular if the first interface is a wireless interface, a system can be provided which enables a usage of the thermal image by both the user himself and also by further persons. The second display device can be, for example, a portable monitor or a portable display screen, which is used by the user or another person, or is integrated into the protective clothing of the user.

In some exemplary embodiments, the second display device can be configured, for example, to be mechanically coupled to a (second) fastening element of a respiratory protection mask or a helmet, in order to fasten the second display device on the respiratory protection mask or the helmet. The second display device can accordingly furthermore be configured to output an optical image based on the data of the thermal image. The user can thus observe the thermal image via the second display device fastened to the respiratory protection mask or helmet and use both hands at the same time. If the second display device is fastened to the respiratory protection mask such that it is located in an intermediate space between the face of the user and the mask, the thermal image can moreover be perceived by the user free of external influences (for example, condensation, smoke, or vapor/steam).

An energy saving coupling with a first display device may alternatively be performed via the second interface depending on the situation. The user is therefore completely free in the use of the thermal imaging camera.

Exemplary embodiments moreover relate to a further camera system. The camera system comprises a thermal imaging camera described herein and also a display device, which has a third interface, which is configured to be mechanically coupled to the second interface of the thermal imaging camera. The thermal imaging camera can accordingly be coupled in a power-saving manner to the display device and the thermal image can be output to the user and optionally also to further persons via the display device.

Depending on the situation, the user can moreover decide to decouple the thermal imaging camera from the display device and carry it, for example, in the hand or on the protective clothing, such that the output of the data of the thermal image takes place via the first interface. The user is therefore completely free in the use of the thermal imaging camera.

As already indicated above, the display device can be connected both in a wirelessly and also wired manner to the thermal imaging camera. In some exemplary embodiments, the display device can therefore furthermore be configured to receive the data of the thermal image via the third interface or via a fourth interface, which is wirelessly coupled to the first interface of the thermal imaging camera. For example, the display device can be coupled via the third interface to the thermal imaging camera when the user uses thermal imaging camera and display device together like a classic portable thermal imaging camera. The display device can be wirelessly coupled to the first interface of the thermal imaging camera, for example, via the fourth interface if the display device is used by a third person different from the user, for example, to view the thermal image of the user at some distance or in the scope of a tactical discussion. The camera system can thus enable an efficient use of the thermal imaging camera by multiple persons (for example, a fire brigade of the fire department).

In some exemplary embodiments, the display device is therefore configured to output an optical image based on the data of the thermal image (for example, a color-coded image and/or an image coded in grayscale).

Like the thermal imaging camera as well, the display device can also be configured according to some exemplary embodiments to detect a mechanical coupling of the third interface to the second interface of the thermal imaging camera. In this manner, the display device can be set, for example, in an adapted operating mode. For example, one or more functionalities of the display device can be activated and/or deactivated.

If the mechanical coupling of the third interface to the second interface of the thermal imaging camera is detected by the display device, the display device may be configured in some exemplary embodiments, for example, to deactivate the fourth interface, which is wirelessly coupled to the first interface of the thermal imaging camera, or set it into a power-saving mode. Since the data of the thermal image can be transmitted in a wired manner as a result of the coupling of the third interface to the second interface of the thermal imaging camera, the wireless interface can in the meantime be deactivated or set into the power-saving mode for power saving.

As already stated above, the display device can also be used for the control and/or operation of the thermal imaging camera. According to some exemplary embodiments, the display device can be configured to receive a user input and to output a control command for the thermal imaging camera via the third interface to the second interface based on the user input. For example, the display device can have a touch-sensitive display or one or more button, switch, knob, controller, etc., in order to receive the user input. A further option for controlling and/or operating the thermal imaging camera can thus be provided in the coupled state.

The display device may moreover process and display data of further devices. In some exemplary embodiments, the display device is configured, for example, to receive further data from a third-party device via the fourth interface and to output the optical image based on the further data. The third-party device can be, for example, a further electronic system of the protective clothing of the user or also a command station or control room. In this manner, for example, telemetry data of a component of his protective clothing (for example, gas pressure of a pressure bottle of a respiratory protection device, measured value of a sensor on the protective clothing) or telemetry data of a further person (for example, further firefighter of his/her fire brigade) can be transmitted to the user.

According to some exemplary embodiments, the display device can furthermore comprise a (second) holding device, which is configured to be grasped by a human hand, in order to hold the display device and the thermal imaging camera in the case of a mechanical coupling of the third interface to the second interface of the thermal imaging camera. The user can accordingly be provided a further option for holding the thermal imaging camera in the coupled state.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
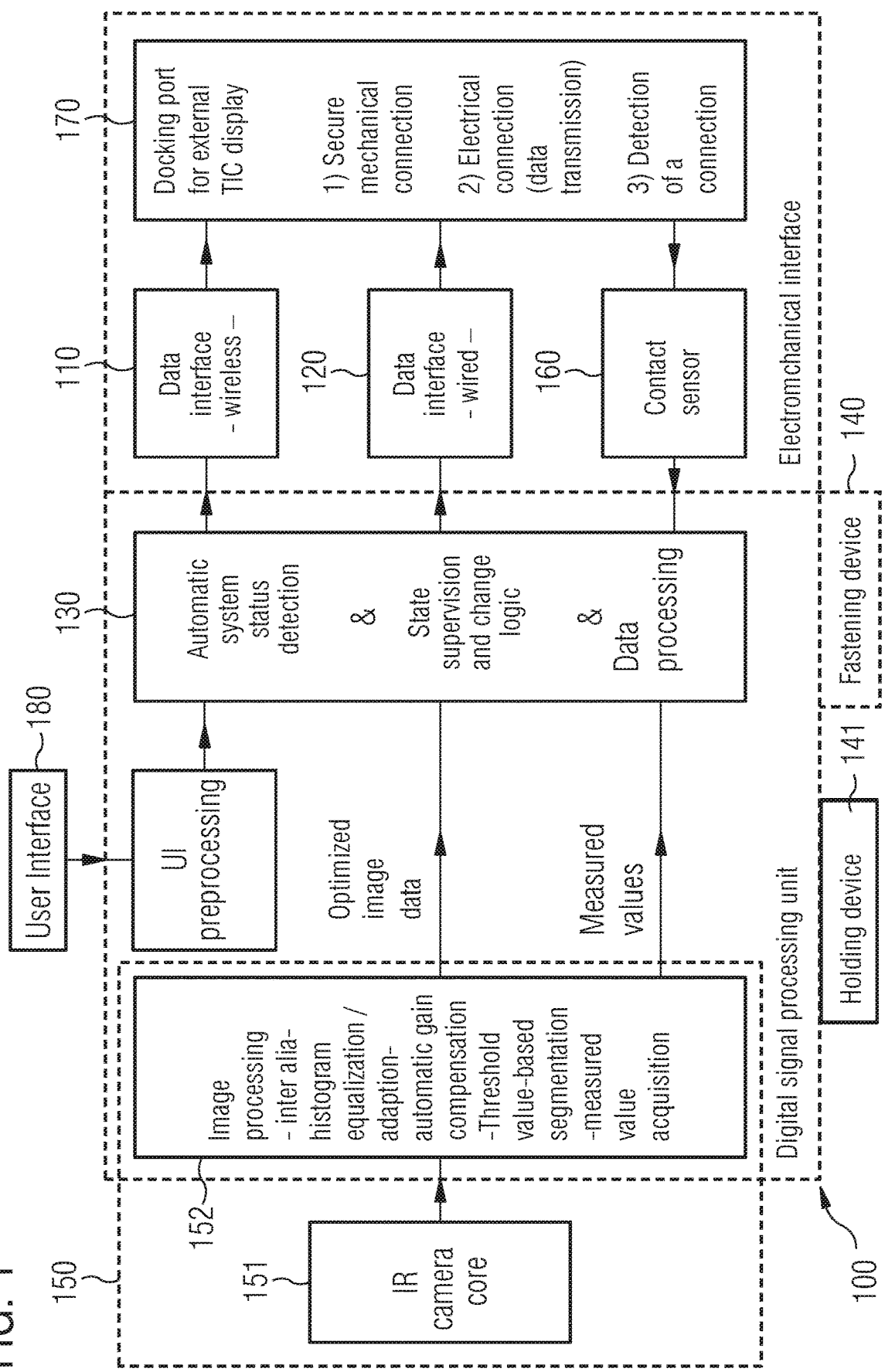
FIG. 1 is a schematic view showing an exemplary embodiment of a thermal imaging camera.

Referring to the drawings, various examples will now be described with reference to the attached figures, in which some examples are shown. The thicknesses of the lines, layers and/or areas may be exaggerated in the figures for illustration.

While additional examples are suitable for different modifications and alternative forms, some certain examples thereof are correspondingly shown in the figures and will be described in detail below. However, this detailed description does not limit additional examples to the specific forms described. Further examples may cover all modifications, equivalents and alternatives, which are within the scope of the disclosure. Identical reference numbers designate in the entire description identical or similar elements, which may be implemented identically or in a modified form in a comparison with one another, while they provide the same function or a similar function.

FIG. 1 shows a thermal imaging camera 100. The thermal imaging camera 100 comprises an image generating circuit (processing unit) 150, which is configured to generate data of a thermal image based on infrared radiation (and optionally also visible optical radiation) in surroundings of the thermal imaging camera 100. The image generating circuit 150 can comprise, for example, in addition to a first circuit part 151, which generates a raw image, also a second circuit part 152, which carries out image processing and/or image optimization. In addition to the image generating circuit 150, the thermal imaging camera 100 can furthermore also comprise one or more optical imaging elements for this purpose, for example, a lens, an optical filter, etc. For reasons of comprehensibility, these are not shown in FIG. 1. As illustrated in FIG. 1, parts of the image generating circuit 150 may have both an analog configuration and also a digital configuration.

Thermal imaging camera 100 furthermore comprises a fastening device 140, which is configured to be mechanically coupled to a fastening element of protective clothing of a user in order to fasten the thermal imaging camera 100 detachably on the protective clothing of the user.

Furthermore, the thermal imaging camera 100 comprises a holding device 141, which is configured to be grasped by a human hand to hold the thermal imaging camera 100. The holding device may be provided, for example, by a correspondingly configured housing of the thermal imaging camera 100 or a handle on the thermal imaging camera 100.

Furthermore, thermal imaging camera 100 comprises a wireless first interface 110 and a wired second interface 120, which are each configured to output the data of the thermal image to third-party devices, such as display devices (for example, monitors or display screens or displays).

Thermal imaging camera 100 furthermore comprises a control circuit 130, which is configured to detect a mechanical coupling of the second interface 120 to a third interface of a display device (not shown) and to output the data of the thermal image exclusively via the second interface 120 as a consequence of the detection of the mechanical coupling. The detection of the coupling takes place in this case via a sensor 160. Sensor 160 is configured to output a detection signal to the control circuit 130 as a consequence of the mechanical coupling of the second interface 120 to the third interface of the display device. The control circuit 130 is in turn configured to detect the mechanical coupling of the second interface 120 to the third interface of the display device based on the detection signal.

The control circuit 130 is furthermore configured to output the data of the thermal image wirelessly via the first interface 110 if the second interface 120 is not mechanically coupled to the third interface of the display device.

For the coupling of the second interface 120 to the third interface of the display device, a housing of the thermal imaging camera 100 may be shaped, for example, such that the display device may be plugged onto the thermal imaging camera 100 or the thermal imaging camera 100 may be plugged onto the display device. In other words: The thermal imaging camera 100 can have a docking port 170.

Because of the option of reversible fastening of the thermal imaging camera 100 on the protective clothing, the thermal imaging camera 100 can not only be worn on the protective clothing, but rather can also be carried and/or used in the hand by the user. The user can accordingly carry the thermal imaging camera 100 depending on the situation and/or according to his personal preference in the hand or fastened on his protective clothing.

Due to the option of the coupling to display devices via the interfaces 110 and 120, the thermal image can moreover be made accessible to the user and also to further persons. The output of the data of the thermal image via the second interface 120 upon coupling of the thermal imaging camera 100 to the display device can enable a reliable and power-saving transmission of the data to the display device. In some exemplary embodiments, the data of the thermal image can still furthermore be transmitted via the first interface 110 upon the mechanical coupling of the second interface 120 to the third interface of the display device. In this case, however, an emission power of the high-frequency signal may be reduced, for example.

The thermal imaging camera 100 therefore enables improved usability by the user.

Control commands for the thermal imaging camera 100 may be performed via one or more operating devices 180 of the thermal imaging camera 100. Moreover, control commands may be received from the third interface of the display device via the second interface 120. In both cases, the control circuit 130 controls the thermal imaging camera 100 based on the control commands.

FIG. 1 therefore shows a camera module which is capable of recording infrared radiation (and optionally additionally visible radiation), processing the recorded radiation (for example, automatic gain compensation, histogram equalization/adaptation, threshold value-based segmentation, compression), and providing image/video data via an interface (wireless or wired). In addition, the camera module contains interaction elements for the user.

Figure 2:
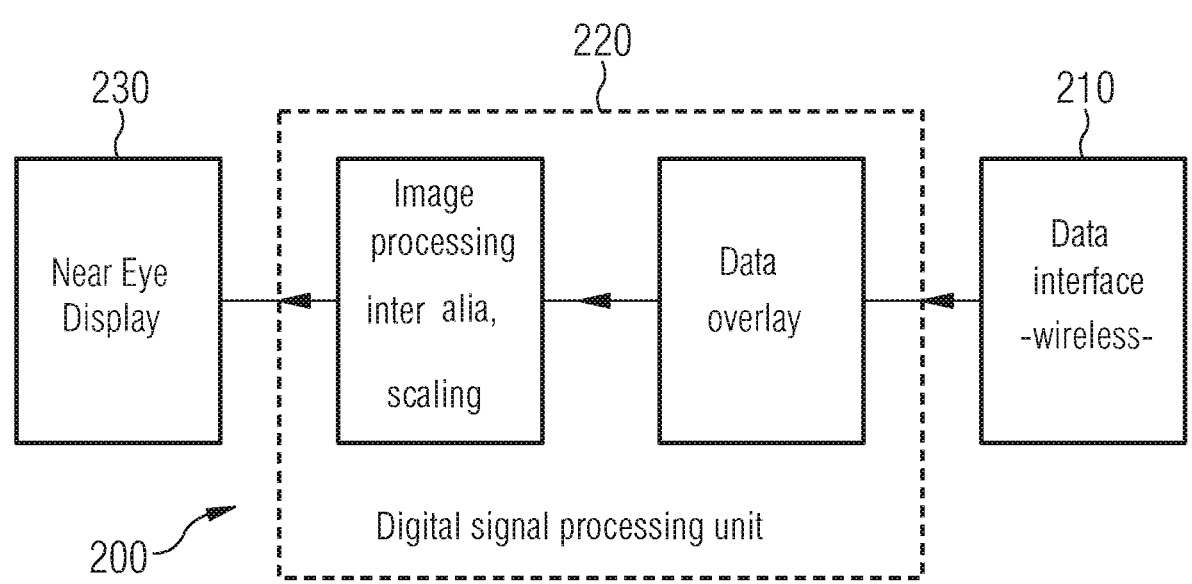
FIG. 2 is a schematic view showing an exemplary embodiment of a display device.

FIG. 2 furthermore shows a display device 200. The display device 200 comprises a wireless interface 210, which may be wirelessly coupled to the first interface 110 of the thermal imaging camera 100. The display device 200 is accordingly configured to receive the data of the thermal image from the first interface 110 of the thermal imaging camera 100.

The display device 200 furthermore comprises a processing circuit (processing unit) 220, comprising one or more processors with associated memory, which is configured to process the data of the thermal image and activate a monitor or a display screen 230 of the display device 200.

Display device 200 may be configured, for example, to be mechanically coupled to a fastening element of a respiratory protection mask or a helmet, in order to fasten the display device 200 on the respiratory protection mask or the helmet. For example, the display device 200 may be configured such that at least the monitor or the display screen 230 may be inserted or integrated into a full-face respiratory protection mask (near eye display or heads-up display). Alternatively, the display device 200 can also be configured such that the monitor or the display screen 230 is attached externally to the respiratory protection mask.

The wireless interface 210 can alternatively also be embodied as a wired interface in some exemplary embodiments. For example, if the first interface of the thermal imaging camera is also embodied as wired.

Figure 3:
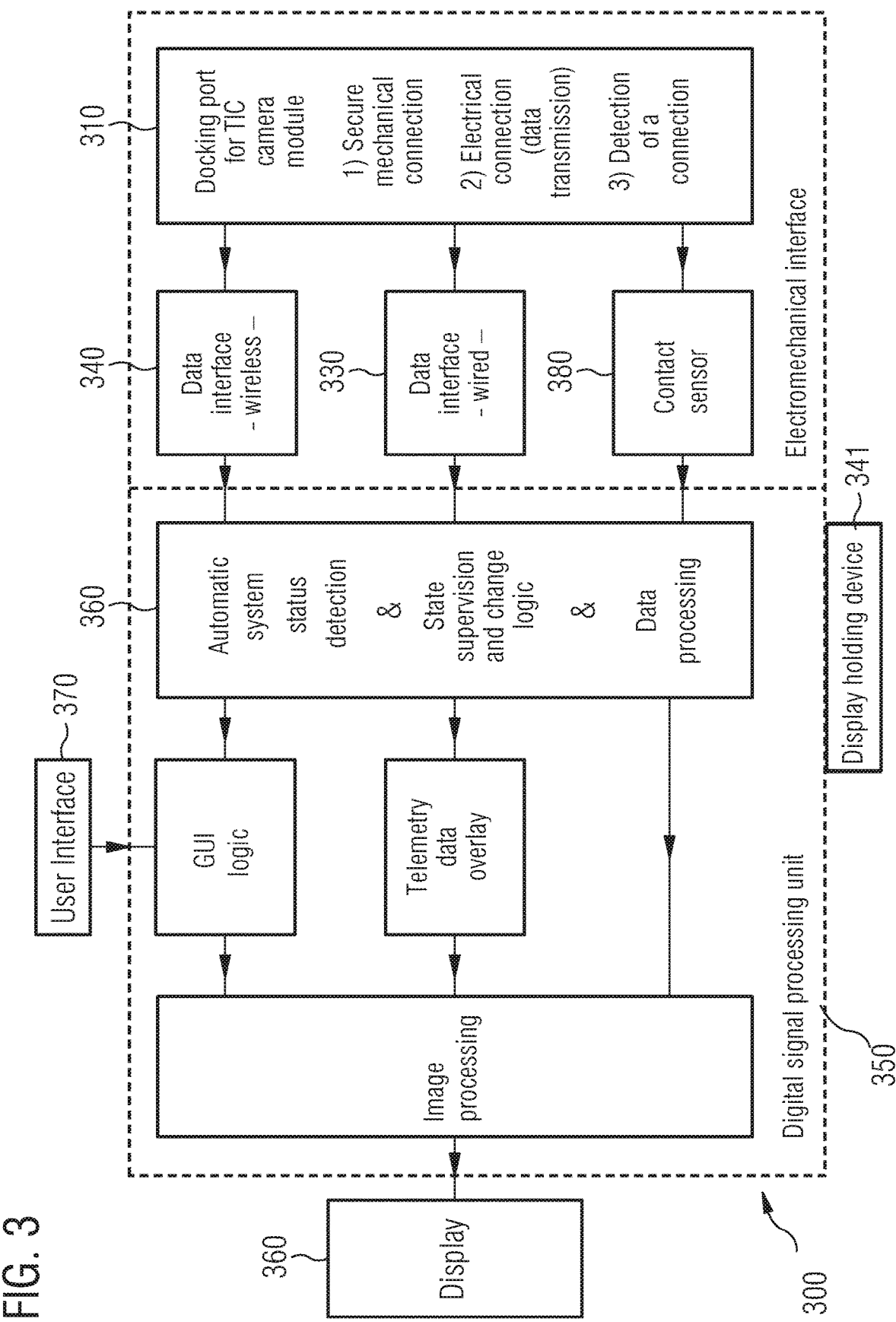
FIG. 3 is a schematic view showing another exemplary embodiment of a display device.

FIG. 3 shows a further display device 300. The display device 300 comprises a third interface 330, which is configured to be mechanically coupled to the second interface 120 of the thermal imaging camera 100. Moreover, the display device 300 comprises a fourth interface 340, which is configured to be wirelessly coupled to the first interface 110 of the thermal imaging camera 100. Accordingly, the display device 300 may be coupled and/or connected both in a wireless and also wired manner to the thermal imaging camera.

For the coupling of the third interface 330 to the second interface 120 of the thermal imaging camera 100, a housing of the display device 300 may be formed, for example, such that the display device 300 may be plugged onto the thermal imaging camera 100 or the thermal imaging camera 100 may be plugged onto the display device 300. In other words: The display device 300 can have a docking port 310. Thermal imaging camera 100 and display device 300 are therefore configured such that they may be connected to one another via a mechanical interface and disconnected again.

The data of the thermal image are received from the thermal imaging camera 100 via the third interface 330 or via the fourth interface 340. The display device 300 furthermore comprises a processing circuit (processing unit) 350, which is configured to process the data of the thermal image and to activate a monitor or a display 360 of the display device 300. The processing circuit 350 comprises one or more processors and associated memory. The display device 300 is configured to output an optical image based on the received data of the thermal image.

The processing circuit (processing unit) 350 is furthermore configured to detect a mechanical coupling of the third interface 330 to the second interface 120 of the thermal imaging camera 100. The detection of the coupling again takes place via a sensor 380. Sensor 380 is configured to output a detection signal to the processing circuit 350 as a result of the mechanical coupling of the third interface 330 to the second interface 120 of the thermal imaging camera 100. The processing circuit 350 is configured to detect the mechanical coupling of the third interface 330 to the second interface 120 of the thermal imaging camera 100 based on the detection signal. The display device 300 may be set into an adapted mode of operation of the of the display device. For example, the processing circuit 350 may further be configured to deactivate the fourth interface 340, which is wirelessly coupled to the first interface 110 of the thermal imaging camera 100, or set the fourth interface 340 into a power-saving (energy-saving) mode.

Display device 300 may further be configured, for example, to receive further data from a third-party device via the fourth interface 340 and to output the optical image on the monitor or display 360 based on the further data. The display device 300 can have, for example, access to a telemetry system via the fourth interface 340, and therefore in addition to the thermal image, telemetry data (for example, bottle pressures in a team of firefighters) may be displayed via the display device 300.

Furthermore, the display device 300 comprises a user interface 370, via which the display device 300 can receive user inputs. Based on the user inputs, the processing circuit 350 generates control commands for the thermal imaging camera 100, which are output via the third interface 330 to the second interface 120 of the thermal imaging camera. The user interface 370 may be implemented, for example, as a touch-sensitive display 360 or one or more buttons, switches, knobs, controllers, etc. In the coupled state, a further option can thus be provided for controlling and/or operating the thermal imaging camera 100.

The display device 300 can therefore enable the user to decide depending on the situation to couple the thermal imaging camera 100 to the display device 300 or decouple the thermal imaging camera 100 therefrom and, for example, carry the thermal imaging camera 100 in the hand or wear it on the protective clothing. The user is therefore completely free in the use of the thermal imaging camera 100.

Although it is not graphically illustrated in FIG. 3, the display device 300 may further comprise a display holding device 341, which is configured to be grasped by a human hand, in order to hold the display device 300 and the thermal imaging camera 100 in the case of a mechanical coupling of the third interface 330 to the second interface 120 of the thermal imaging camera 100. A further option can accordingly be provided to the user for holding the thermal imaging camera 100 in the coupled state.

Figure 4:
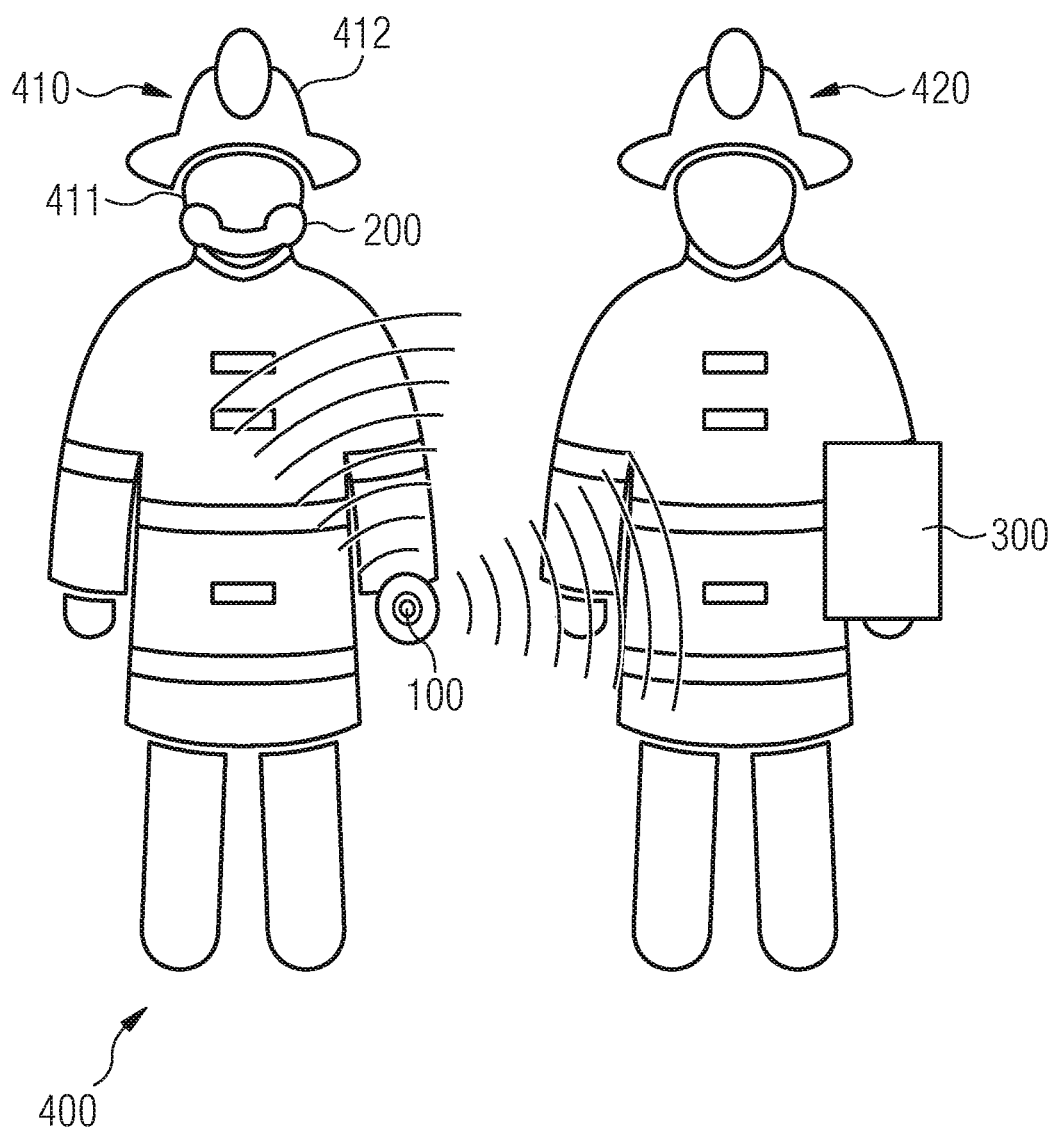
FIG. 4 is a schematic view showing an exemplary embodiment of a camera system.

A camera system 400 according to the present disclosure is shown in FIG. 4. FIG. 4 shows a first firefighter 410 and a second firefighter 420. The first firefighter 410 holds the above-described thermal imaging camera 100 in one hand. The thermal imaging camera emits the data of the recorded thermal image by means of a high-frequency signal via the first interface.

The first firefighter 410 moreover wears a respiratory protection mask 411, in which the above-described display device 200 is integrated. The first firefighter 410 can accordingly observe the thermal image of the thermal imaging camera 100 by means of the display device 200.

The second firefighter 420 holds the above-described display device 300 in his/her hands. The second firefighter 420 can also observe the thermal image of the thermal imaging camera 100 via the display device 300.

The modular camera system 400 thus enables a joint situation assessment by the two firefighters 410 and 420, i.e., a joint observation of the thermal image with a colleague. The modular camera system 400 also enables a transfer of the thermal imaging camera 100 and also the display device 300 from the first firefighter 410 to the second firefighter or vice versa.

Because of the option of the mechanical coupling of thermal imaging camera 100 and display device 300, these may be used as a conventional thermal imaging camera. For example, in the case of a use without full-face mask during follow-up operations after a fire or the assessment of a situation.

Because of the option of fastening the thermal imaging camera 100 on the respiratory protection mask 411, the helmet 412, or another component of the protective clothing of the first firefighter 410, the thermal imaging camera 100 may also be used in, for example, helmet-integrated or full-face-mask-integrated form. A respiratory protection wearer, such as firefighter 410, thus has free hands during the use of the thermal imaging camera 100 and can thus, for example, better orient himself and/or move in a smoky environment.

In other words, the present disclosure comprises a thermal imaging camera for use in fire fighting, which is configured such that it is usable both for use with full-face (gas) mask and free hands and also without full-face mask. As shown in FIG. 4, a system comprising three components namely, the thermal imaging camera 100 (with an infrared camera core, the first circuit part 151, which generates a raw image), display device 200 (near eye display) and display device 300 (external display), may be used for this.

Figure 5:
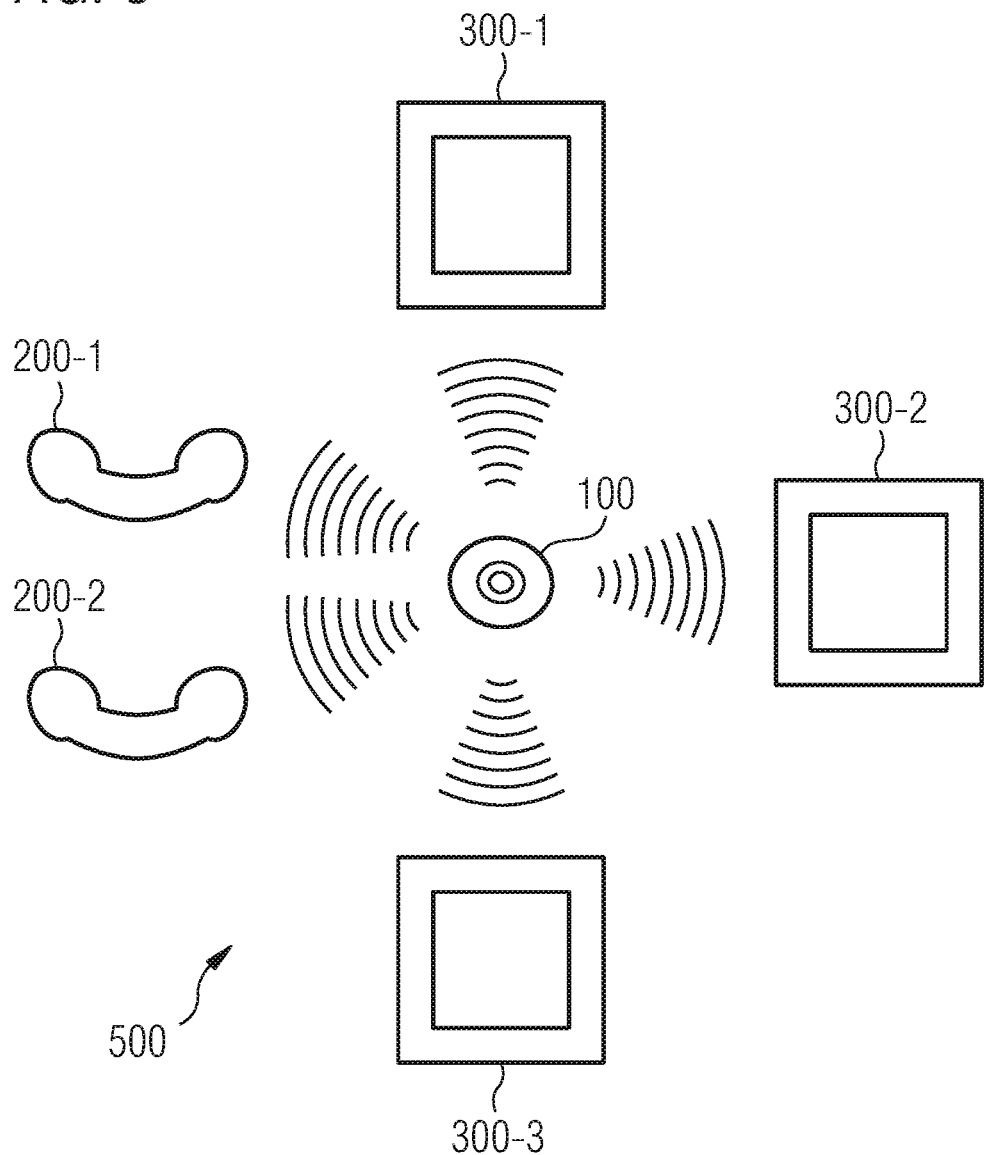
FIG. 5 is a schematic view showing another exemplary embodiment of a camera system.

Finally, still a further camera system 500 is shown in FIG. 5. In contrast to the camera system 400 shown in FIG. 4, the camera system 500 comprises in each case multiple display devices 200 and multiple display devices 300. In the example of FIG. 5, the camera system 500 comprises two of the display devices 200-1 and 200-2 shown in FIG. 2 and three of the display devices 300-1, 300-2, and 300-3 shown in FIG. 3. The thermal imaging camera 100 outputs the high-frequency signal having the data of the thermal image to the display devices via the first interface.

It is thus seen in FIG. 5 that any desired number of display devices may be used rather than just one.

The concept of the present disclosure can enable a (substantial) improvement of the usability of thermal imaging cameras. Moreover, the concept of the present disclosure can enable an expansion of the usage spectrum of thermal imaging cameras by way of the option of combining the basic components of the concept differently. In addition, the option results of efficiently using the thermal imaging camera jointly in the team.

The aspects and features which are described together with one or more of the above-detailed examples and figures can also be combined with one or more of the other examples in order to replace the same feature of another example or to additionally introduce the feature into the other example.

While specific embodiments of the invention have been shown and described in detail to illustrate the application of the principles of the invention, it will be understood that the invention may be embodied otherwise without departing from such principles.

What is claimed is:

1. A thermal imaging camera comprising:
   a thermal imaging camera structure comprising:
      a fastening device configured to be mechanically coupled with a fastening element of protective clothing of a user and to be to be detachable therefrom to detachably fasten the thermal imaging camera on the protective clothing of the user;
      a first interface configured to output data of a thermal image;
      a second interface configured to output the data of the thermal image; and
      a control circuit configured to:
         detect a mechanical coupling of the second interface with a third interface of a display device and to output the data of the thermal image exclusively via the second interface as a result of the detection of the mechanical coupling; and
         output the data of the thermal image via the first interface when the second interface is not coupled mechanically with the third interface.

2. A thermal imaging camera in accordance with claim 1, wherein the first interface comprises a high-frequency transmitter, which is configured to output a high-frequency signal based on the data of the thermal image.

3. A thermal imaging camera in accordance with claim 2, wherein the control circuit is further configured in case of the mechanical coupling of the second interface with the third interface of the display device to prompt completion of an algorithm to be executed in connection with the generation of the high-frequency signal by the thermal imaging camera.

4. A thermal imaging camera in accordance with claim 1, wherein the first interface comprises an electrical contact configured to output an electrical signal based on the data of the thermal image.

5. A thermal imaging camera in accordance with claim 1, further comprising a holding device configured to be grasped by a human hand for holding the thermal imaging camera.

6. A thermal imaging camera in accordance with claim 1, further comprising an image generation circuit configured to generate the data of the thermal image based on infrared radiation in an area of the thermal imaging camera.

7. A thermal imaging camera in accordance with claim 1, wherein:
   the second interface is configured to receive a control command from the third interface of the display device; and
   the control circuit is further configured to control the thermal imaging camera based on the control command.

8. A thermal imaging camera in accordance with claim 1, further comprising a sensor configured to output a detection signal as a result of the mechanical coupling of the second interface with the third interface, wherein the control circuit is configured to detect the mechanical coupling of the second interface with the third interface based on the detection signal.

9. A thermal imaging camera in accordance with claim 1, wherein the second interface is a wired interface.

10. A thermal imaging camera in accordance with claim 1, wherein the protective clothing comprises a gas mask or a helmet.

11. A camera system comprising:
    a thermal imaging camera comprising:
       a fastening device configured to be mechanically coupled with a fastening element of protective clothing of a user and to be to be detachable therefrom to detachably fasten the thermal imaging camera on the protective clothing of the user;
       a first interface configured to output data of a thermal image;
       a second interface configured to output the data of the thermal image; and
       a control circuit configured to:
          detect a mechanical coupling of the second interface with a third interface of a display device and to output the data of the thermal image exclusively via the second interface as a result of the detection of the mechanical coupling; and
          output the data of the thermal image via the first interface when the second interface is not coupled mechanically with the third interface; and
    another display device configured to receive the data of the thermal image from the first interface of the thermal imaging camera.

12. A camera system in accordance with claim 11, wherein the another display device is further configured to be mechanically coupled with a gas mask or helmet fastening element of a gas mask or of a helmet so as to fasten the second display device to the gas mask or the helmet.

13. A camera system comprising:
    a thermal imaging camera comprising:
       a fastening device configured to be mechanically coupled with a fastening element of protective clothing of a user and to be to be detachable therefrom to detachably fasten the thermal imaging camera on the protective clothing of the user;
       a first interface configured to output data of a thermal image;
       a second interface configured to output the data of the thermal image; and
       a control circuit configured to:
          detect a mechanical coupling of the second interface with a third interface of a display device and to output the data of the thermal image exclusively via the second interface as a result of the detection of the mechanical coupling; and output the data of the thermal image via the first interface when the second interface is not coupled mechanically with the third interface; and the display device with the third interface, the third interface of the display device being configured to be mechanically coupled with the second interface of the thermal imaging camera.

14. A camera system in accordance with claim 13, wherein the display device is further configured to receive the data of the thermal image via the third interface or via a fourth interface, which fourth interface is wirelessly coupled with the first interface of the thermal imaging camera.

15. A camera system in accordance with claim 13, wherein the display device is further configured to output an optical image based on the data of the thermal image.

16. A camera system in accordance with claim 13, wherein the display device is further configured to detect a mechanical coupling of the third interface with the second interface of the thermal imaging camera.

17. A camera system in accordance with claim 16, wherein the display device is further configured, upon the display device detecting the mechanical coupling of the third interface with the second interface of the thermal imaging camera, to deactivate a fourth interface, which is wirelessly coupled with the first interface of the thermal imaging camera, or to bring the fourth interface into an energy-saving mode.

18. A camera system in accordance with claim 13, wherein the display device is further configured to receive a user input and to output a control command for the thermal imaging camera via the third interface to the second interface of the thermal imaging camera based on the user input.

19. A camera system in accordance with claim 13, wherein the display device is further configured to receive additional data from a third device via a fourth interface and to output an optical image based on the additional data.

20. A camera system in accordance with claim 13, wherein the display device comprises a second holding device configured to be grasped by a human hand so as to hold the display device and the thermal imaging camera in case of a mechanical coupling of the third interface with the second interface of the thermal imaging camera.

* * * * *